Feb. 15, 1955  F. J. SCHNEIDER ET AL  2,702,010
FLAKING MACHINE
Filed Jan. 19, 1949  2 Sheets-Sheet 1
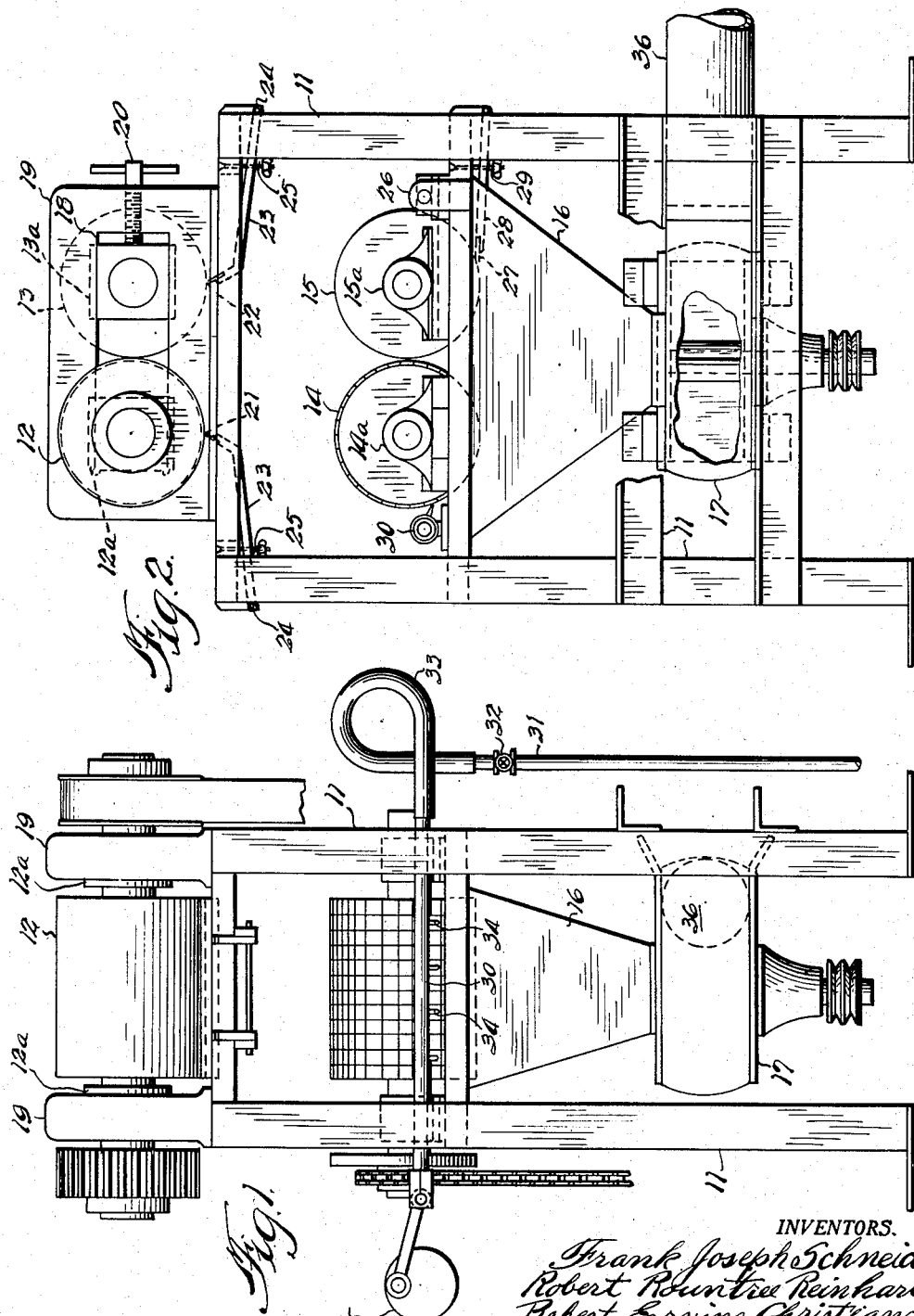
INVENTORS.
Frank Joseph Schneider
Robert Rountree Reinhart
Robert Ervine Christian.

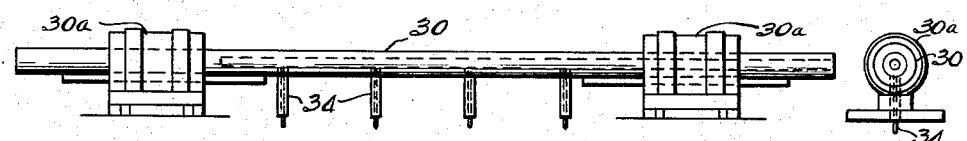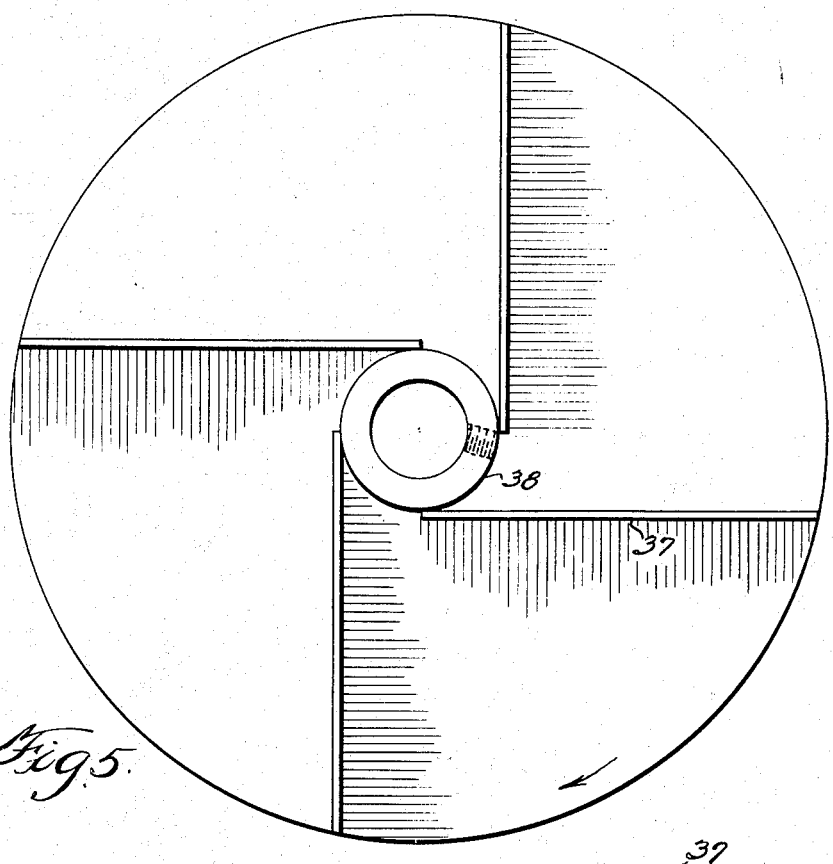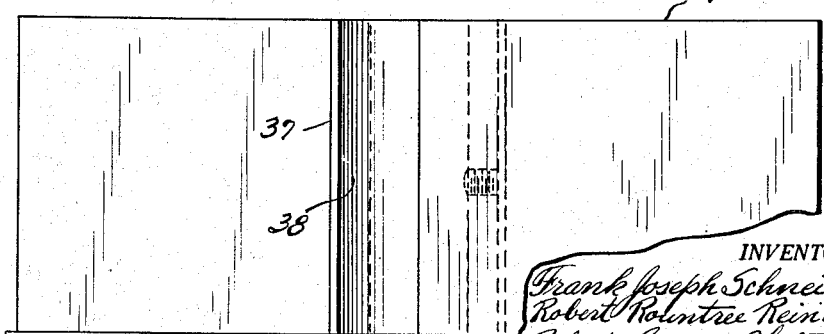

United States Patent Office 2,702,010
Patented Feb. 15, 1955

2,702,010

FLAKING MACHINE

Frank J. Schneider and Robert R. Reinhart, Chicago, and Robert E. Christian, Oaklawn, Ill., assignors to The Quaker Oats Company, Chicago, Ill., a corporation of New Jersey Application January 19, 1949, Serial No. 71,722

2 Claims. (Cl. 107—4)

This invention relates to a method and apparatus for preparing a ready-to-eat cereal in flake form. This invention has as an object an improved apparatus for producing such a cereal flake.

In application No. 640,678 by Edward F. Lilly and Eldor G. Rupp now Patent No. 2,552,290, issued May 8, 1951 and in application No. 767,861 by Eldor G. Rupp now Patent No. 2,552,291, issued May 8, 1951, both applications being assigned to the same assignee as in the present case, there is disclosed an improved ready-to-eat oat cereal and a method for producing the dough from which the same is produced. It is another object of this invention to provide an improved apparatus for mechanically forming cereal flakes from cereal dough produced in accordance with those inventions or in any other manner.

According to this invention, a prepared dough is fed to a pair of smooth-surfaced squeeze rollers which roll the dough into a sheet of the desired thickness and reasonable width. This sheet then passes between another pair of rollers, one of which has a smooth surface and the other of which is embossed with a suitable flake design. As the sheet of dough passes between the second set of rollers, the design appearing on the one roller is imprinted on the dough. The dough then passes into a rotary blower and the individual flakes are thereby caused to separate.

Another feature of this invention is the air brush which serves to remove dough from the embossed roller in the event that the sheet of dough or individual flakes adhere thereto.

Accordingly, it is another object of this invention to provide an improved apparatus for rolling cereal dough into sheets.

It is another object of this invention to provide improved apparatus for obtaining individual flakes from a sheet of cereal dough whether cooked or uncooked.

It is another object of this invention to provide an improved apparatus for imprinting on or cutting from a sheet of cereal dough a flake of predetermined design.

It is another object of this invention to provide improved apparatus for breaking up such a sheet of dough having a flake design imprinted thereon.

It is another object of this invention to provide improved apparatus for removing dough which may adhere to such an embossed roller.

It is another object of this invention to provide an economical, efficient and durable apparatus for accomplishing these results.

This invention, together with further objects and advantages thereof, will best be understood by reference to the following description taken in connection with the accompanying drawings, and its scope will be pointed out in the appended claims.

In the drawings:

Fig. 1 is a side elevation of apparatus constructed in accordance with this invention;

Fig. 2 is an end elevation of the same apparatus partially broken away;

Fig. 3 is an enlarged view of the air brush appearing in Figs. 1 and 2;

Fig. 4 is an end view of the air brush shown in Fig. 3;

Fig. 5 is a top view of the blower rotor; and

Fig. 6 is a side view of the blower rotor shown in Fig. 5.

Referring more particularly to the drawings, there is shown an apparatus embodying the present invention for forming cereal flakes from suitable dough such as that described in the Lilly and Rupp Patent No. 2,552,290. According to this patent the dough may be prepared by mixing oat flour, preferably defatted, with water and small amounts of salt, sugar and malt syrup in a steam jacketed pressure and vacuum-equipped dough mixer. After the materials have been placed in the mixer, the mixer is closed and the kneading action is started. Steam up to 30 pounds pressure is supplied to the jacket. During the cooking and kneading of the dough, pressure builds up in the sealed mixing chamber and is maintained at about 10–12 pounds pressure by means of a relief valve. After being cooked the dough is rapidly dried to a moisture content of about 30%. The resulting dough is quite coherent and rubbery and may be readily formed into thin sheets and flakes having a thickness of about 0.01 to 0.015 of an inch. These flakes are then cooked in a suitable oven to produce the prepared cereal flakes which are generally somewhat thicker than the dough flakes.

A framework 11 supports a pair of squeeze rollers 12 and 13, a second pair of rollers 14 and 15, a hopper or funnel 16 and a blower 17. The first pair of rollers 12 and 13 have smooth surfaces and their function is to roll the cereal dough into a smooth continuous sheet of uniform thickness and width, the dough preferably being precooked.

These rollers 12 and 13 are mounted in bearings 12a and 13a respectively, bearings 13a being slidably mounted in slots 18 in bearing frames 19. As best shown in Fig. 2, a pair of screws 20 are provided to limit the movement of bearings 13a in an outward direction. These screws are used to control the thickness of the rolled sheet, an inward movement of the screws causing bearings 13a to move to the left of Fig. 2 and resulting in a thinner sheet.

The dough may be fed to rollers 12 and 13 in any suitable manner but it has been found by experiment that dough which has been extruded, and preferably in a substantially cylindrical form, is desirable since it results in a constant and uniform feeding of the dough to the rollers. The extruding process is also believed to have a beneficial effect on the dough in that the resulting sheet may be easily and uniformly blistered by subsequent toasting.

As the dough passes between rollers 12 and 13, it normally tends to adhere to one of the rollers. This tendency may be reduced by the application of a minute amount of oil to the rollers or the tendency may be controlled, that is, the sheet may be made to adhere to one particular roll, by applying the oil to only one roller. Another method of causing the sheet to adhere to one particular roller is to obtain a slightly higher circumferential speed in one roller than in the other. This will result in a slight shearing action and the sheet of dough will tend to adhere to the faster moving roll.

In the embodiment shown, scrapers 21 and 22 are shown, one for each roller. Scrapers 21 and 22 are supported by arms 23 pivoted at 24 and are held resiliently against the rollers by spring connections 25 comprising bolts passing through arms 23 and carrying compression springs urging said arms upwardly to press said scrapers against rollers 12 and 13.

From the rollers 12 and 13, the rolled sheet of dough passes downwardly to the second pair of rollers 14 and 15. Rollers 14 and 15 are mounted in bearings 14a and 15a, respectively, bearings 15a being slidably mounted on frame 11. Outward movement of roller 15 is limited by an adjustable roller device 26 which is slidably secured to the beam which supports the rollers, and is bolted into the desired position.

The cylindrical surface of roller 14 is embossed with any suitable flake design, preferably one such as will permit the utilization of the entire sheet of dough with no waste cut-outs between flakes. The depth of the embossing should be substantially equal to or greater than the thickness of the sheet since the dough may otherwise be pressed against the depressed portions of the roller and tend to adhere thereto.

Preferably rollers 14 and 15 should be spaced apart a minute amount to prevent the complete severance of individual flakes from the sheet. This is desirable since a flake which has been completely severed from the sheet will tend to stick to the embossed roller and will be difficult to remove. The most efficient practice is to leave just enough of the thickness of the sheet unsevered that substantially all of the flakes will be retained as a part of the continuous sheet.

It has been found by experiment that the circumferential velocity of rollers 14 and 15 should exceed that of rollers 12 and 13 by a small percentage. This prevents the possible accumulation of slack between pairs of rollers, aids in the removal of the sheet from either of rollers 12 or 13 to which the sheet may tend to adhere, and causes the sheet of dough to be fed to rollers 14 and 15 in a clean and uniform manner.

A scraper 27 is held against the surface of roller 15 by arm 28 and resilient connection 29 similar to connection 25 to scrape the sheet from that surface in the event that it should adhere thereto. The most satisfactory known method of removing the sheet from the embossed roller 14 is by an air brush 30. Air under pressure coming from a source such as pipe 31, shown in Fig. 1, passes through a control valve 32, through a flexible connection 33 and to air brush 30. As best shown in Figs. 3 and 4, the air brush includes a series of nozzles 34 which direct air in high velocity streams against the surface of roller 14 substantially tangentially thereto. The streams of air emitted by nozzles 34 effectively remove any flakes of dough which may have been cut from the sheet. Normally the entire sheet of dough would not adhere to roller 14 to such a degree that it would be carried around to the position of the air brush 30. However, in such an event, the air brush would serve to blow the sheet clear of the roller.

An eccentric 35 is connected to one end of air brush 30 which is slidably mounted on frame 11 in bearings 30a. The action of eccentric 35 causes the air brush to reciprocate and results in a continuous sweeping of the surface of roller 14 by the air streams emitting from nozzles 34. This arrangement permits a saving in the amount of compressed air used as compared to the use of a much larger number of nozzles which would continuously subject the entire length of roller 14 to a blast of air. The amount of lateral movement of brush 30 should, of course, be equal to or greater than the spacing between nozzles 34 in order that all parts of roller 14 will be subjected intermittently to the air blast of at least one nozzle.

As the imprinted sheet of dough and any separated flakes leave rollers 14 and 15, they pass through hopper 16 into rotary blower 17. The violent action of blower 17 causes the separation of the individual flakes one from the other. The separated flakes are blown out through pipe 36 after which they are toasted in a suitable oven.

A desirable form for the rotary member of blower 17 is shown in Figs. 5 and 6. The individual blades 37 are attached tangentially to hub 38 and the rotor is turned in such a direction that the inner edge of each blade 37 is the leading edge. This arrangement substantially eliminates any pockets in which flakes would be likely to accumulate.

In the foregoing description rollers 12 and 13 have been described as suitable means for forming the dough into a continuous sheet prior to passing to the subsequent embossing rollers. However, it will be apparent that other means may be provided for forming such a continuous sheet.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. An apparatus for the production of cereal flakes comprising a first pair of horizontally spaced rollers, a second pair of horizontally spaced rollers positioned below the first pair for receiving therebetween a sheet of dough formed between the first pair of rollers, at least one of said second pair of rollers being provided with an embossing surface, an air brush associated with the roller having the embossing surface, said air brush being arranged to direct a high velocity stream of air substantially tangentially to said roller to insure the disengagement of material therefrom, and a rotary air blower positioned below and in spaced relationship to said second pair of rollers including a central inlet port spaced vertically below said second pair of rollers, blade elements mounted for rotation about a substantially vertical axis passing through said inlet port, a housing for said elements and a discharge port in said housing positioned tangentially of said blade elements.

2. The apparatus recited in claim 1 including means for directing material passed downwardly through said second pair of rollers to the central inlet port of said blower.

References Cited in the file of this patent
UNITED STATES PATENTS

| Number | Name | Date |
|---|---|---|
| 212,811 | Marshall | Mar. 4, 1879 |
| 262,888 | Butler et al | Aug. 15, 1882 |
| 807,420 | Copland | Dec. 12, 1905 |
| 831,910 | Valentine | Sept. 25, 1906 |
| 928,730 | Bausman | July 20, 1909 |
| 1,053,954 | Lentz | Feb. 18, 1913 |
| 1,094,320 | Evans | Apr. 21, 1914 |
| 1,196,241 | Hutzen | Aug. 29, 1916 |
| 1,252,822 | Lorioli | Jan. 8, 1918 |
| 1,675,363 | Lodding | July 3, 1928 |
| 1,692,747 | Lindstrom | Nov. 20, 1928 |
| 1,754,266 | Cox | Apr. 15, 1930 |
| 1,825,559 | Summer | Sept. 29, 1931 |
| 1,949,105 | Lauterbur et al | Feb. 27, 1934 |
| 2,071,434 | Sarnmark | Feb. 23, 1937 |
| 2,131,674 | Salomon et al | Sept. 27, 1938 |
| 2,155,952 | Noxon et al | Apr. 25, 1939 |
| 2,175,337 | Boice | Oct. 10, 1939 |
| 2,258,659 | Mosler, Jr. | Oct. 14, 1941 |
| 2,358,320 | Eisaman | Sept. 19, 1944 |
| 2,593,543 | Curioni | Apr. 22, 1952 |